March 4, 1958 W. PRASE 2,825,674
METHOD OF PRODUCING BOARDS OF PRESSED COMPOSITION MATERIAL
Filed March 29, 1954
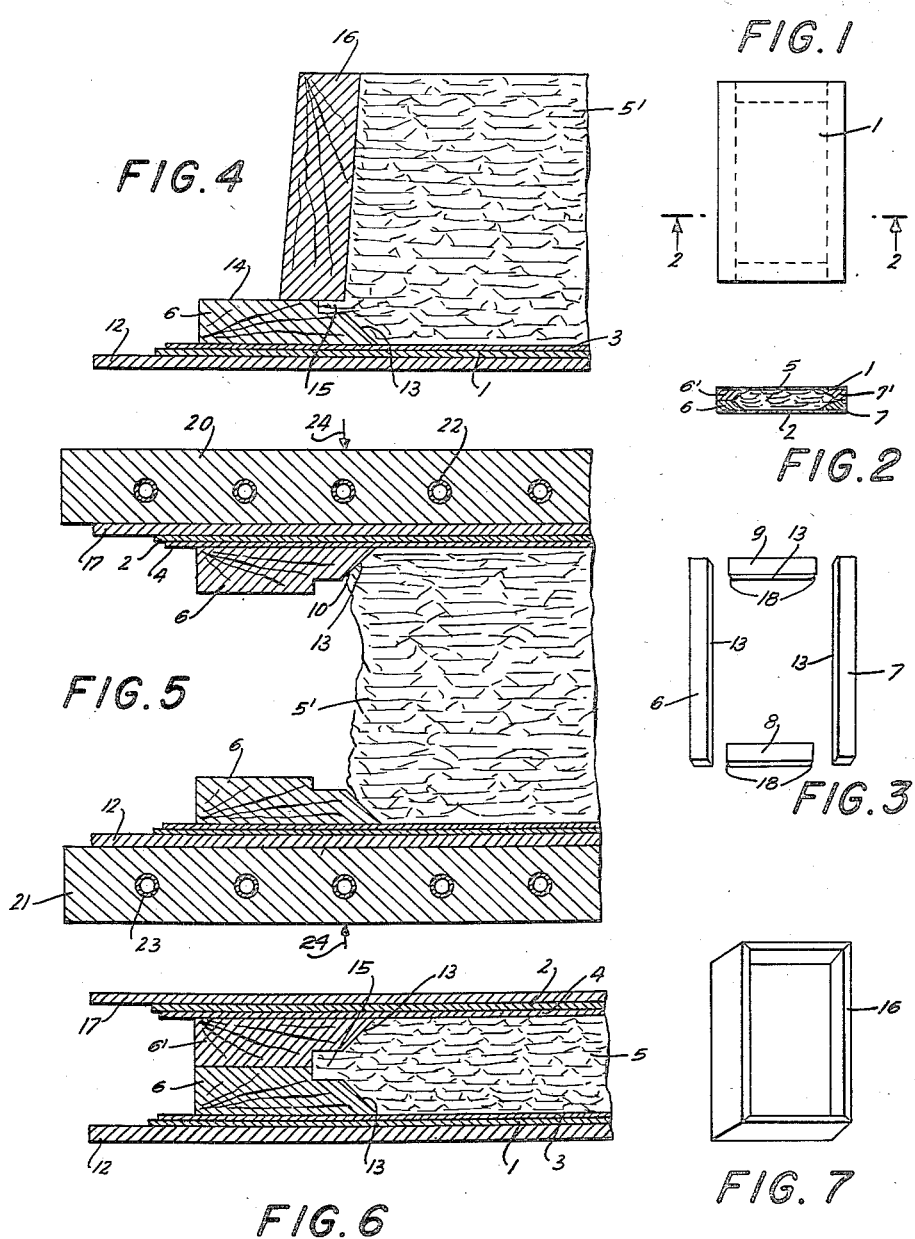
INVENTOR.
Werner Prase
BY Michael S. Striker
agt.

United States Patent Office 2,825,674
Patented Mar. 4, 1958

2,825,674

METHOD OF PRODUCING BOARDS OF PRESSED COMPOSITION MATERIAL

Werner Prase, Stuttgart, Germany

Application March 29, 1954, Serial No. 419,401

Claims priority, application Germany April 2, 1953

8 Claims. (Cl. 154—113)

The present invention relates to a method of producing boards of pressed or molded material. More particularly, the invention relates to a method of making counter-veneered boards which primarily consist of molded or pressed compounds, but give the appearance of solid or veneered wooden boards.

It is the object of the present invention to devise a new method of making boards of the type described which is carried out more easily and at less expense than similar methods previously described and results in a cheaper product but one of superior quality.

Another object of the invention resides in devising a new product for making furniture of various kinds, such as doors, wall panels, and the like, which although of the same outer appearance, is superior to solid, veneered, or laminated wooden boards due to its being absolutely warp-proof, its greater stability but lighter weight, and its higher heat insulating and soundproofing qualities.

Another object of the invention resides in devising a new method of making boards by thoroughly impregnating one or a series of waste products with a suitable adhesive or plastic, inserting such compound in a relatively loose condition between a pair of outer wooden veneers of any desired variety, and highly compressing the packet thus formed to a thickness which is predetermined by a wooden frame intermediate the veneers and forming the sides of the final product.

The essential features of the invention for carrying out these objects consist in building two separate wooden frames of the outer dimensions of the final product, placing one of these frames upon a veneer of one or more plies which is coated with an adhesive or plastic, preferably of the same kind as used for impregnating the filler, placing a filling frame of smaller outer dimensions than said wooden frames upon the lower frame, pouring into the filling frame a filler compound consisting of one or a variety of waste products, which previously have been thoroughly impregnated and mixed with a suitable binder, such as artificial resin or the like, slightly tamping down or compressing such loose filler in the filling frame so as to retain its shape to some extent, then removing the filling frame from the filler, placing a second frame, preferably the exact counterpart to the first frame, upon the outer edges of the filler, placing another veneer of one or more plies, and likewise coated with adhesive, upon the filler and the upper surface of the second frame, then compressing the packet thus formed in a heated veneering press until the opposed inner surfaces of the two frames, which are likewise coated with adhesive, are in contact with each other, and maintaining such pressure until the adhesive or plastic within the filler and on the inner surfaces of the veneers and on both sides of the frames has completely set to bond the packet into a solid board or plate; the outer surfaces and sides may then be further treated like any other solid or laminated wooden board.

Another feature of the invention consists in making the filling frame of a height corresponding to the exact amount of loose filling compound which is required for making a board or plate of the desired thickness and compressive strength, such height of the filling frame and such compressive strength of the final product also depending upon the particular waste material and binding agent used.

Another important feature of the invention resides in providing the upper and lower frames which when compressed and bonded together into one frame determine the thickness of the final product and constitute the outer side walls thereof, with beveled inner edges which, when the packet is being compressed, act similar to an embankment upon the loose filler and tend to press the same toward the middle of the packet, thus preventing the filler from spilling over toward the outside and upon the flat opposed surfaces of the two frames which, subsequently, are bonded together to form a single outer frame.

Still another feature of the invention resides in providing a groove in each frame intermediate the flat opposed surfaces and the inner beveled edges, the particular size and shape of such grooves depending upon the type of filling compound used. The object of these grooves is likewise to prevent the filling compound from spilling over upon the opposed flat surfaces of the frames, to compact the filler in such grooves still more solidly than within the central part of the board or plate, and to act as an air vent for the air escaping from the filling compound during the pressing operation.

Further objects, features, and advantages of the present invention will be apparent from the following detailed description thereof and the accompanying drawings, in which:

Fig. 1 shows a front view of a plate or board of reduced size made according to the invention, and to be used, for example for making a door or a table top or the like;

Fig. 2 is a cross section taken along line II—II of Fig. 1;

Fig. 3 shows details of construction of a frame fitted into the packet and, in the final product, forming the outer walls thereof;

Figs. 4 to 6 shows cross sections taken along similar lines as Fig. 2 but of larger dimensions, and illustrating three different steps in the method of production, Fig. 5 further showing a heated veneer press adapted to be used in the production method according to the present invention; while Fig. 7 is a perspective view of a filling frame according to the invention.

In the drawings, the opposite surfaces of the board or plate illustrated in Figs. 1 and 2 are completely covered by veneers 1 and 2. As shown in Figs. 4 to 6, the veneers 1 and 2 preferably are covered toward the inside by special warp-proofing veneers 3 and 4. The inside of the board contains a filler 5 which may consist of saw dust, wood shavings, vegetable fibers, glass wool, mineral wool, rock wool, peat dust, or the like, or a mixture of any of such materials which is impregnated with an adhesive or binding agent consisting of a synthetic plastic or the like, preferably of the type which sets when subjected to heat. As shown in Figs. 2 and 3, the filler 5 is enclosed on all sides by a frame which is composed of two halves 6, 7, 8, 9 and 6', 7', 8', 9' which are bonded together as subsequently described.

Fig. 4 illustrates an aluminum plate 12 which may be placed upon the heated plate of a veneering press, for example, a multiple layer press. Then, the outer veneer 1 is placed on the aluminum plate 12 and the wrap-proofing veneer 3, which is coated preferably on both sides with a layer of plastic, is placed thereon. Then, a wooden frame composed of the strips 6, 7, 8, 9, as shown in Fig. 3, is placed on the sheet 3. The inwardly directed surfaces 13 of all of these strips are preferably beveled, as shown especially in Figs. 4 to 6, and the lateral ends 18 of the strips 8 and 9 are likewise beveled so as to correspond with and fit upon the beveled surfaces 13 of the strips 6 and 7 when the frame is put together. After connecting the parts 6, 7, 8, and 9 by small nails, pins, staples or the like so as to form a frame, the latter is placed upon the veneer 3, as illustrated in Fig. 4. As shown in Figs. 4 to 6, the inner edge of the upper flat surface 14 of the strip 6 has a longitudinal groove 15 therein of a width $b$ and extending along the entire length of the strip. A similar groove is also provided in each of the other strips 7, 8, and 9 of the frame.

A filling frame 16 is next placed upon the frame 6, 7, 8, 9. The shape of this frame 16 is illustrated in Fig. 7 in a perspective view. It is of such dimensions that part of its lower surface may be placed upon the upper surface 14 of the lower frame 6, 7, 8, 9 which, in turn, lies on the veneer 1 or the intermediate veneer 3, while the inwardly directed edge of the filling frame projects beyond the outer edge of the grooves 15 in the lower frame and covers such grooves.

After the filling frame 16 has been placed upon the frame 6, 7, 8, 9, the filler 5' which, as previously stated, may consist of various organic or inorganic waste products, is poured into the filling frame 16. This frame is preferably made of a height so as to hold just the proper amount of filler required to press a board of the desired thickness and compressive strength in a single pressing operation. Next, the loosely inserted mass 5' is tamped slightly either by hand or a suitable device, just enough to fill out crevices therein and to give it enough body to stand up by itself, whereupon the filling frame 16, which for this purpose is made slightly conical on the inside, is lifted upwardly therefrom. A slight pressure upon the upper surface of the filler 5' after the filling frame 16 has been removed will bulge out the outer edge 10 of the filler from the position shown in Fig. 4 to that shown in Fig. 5 an amount sufficient to permit a second outer frame 6', 7', 8', 9', which may be the exact counterpart of the lower frame 6, 7, 8, 9, to be placed lightly upon the upper surface of the filler 5', the beveled inner surfaces 13 of the strips 6', 7', 8', 9' then resting upon the outer edges 10 of the upper surface of the loosely packed filler 5' and retaining the frame in such position.

Thereupon, the upper frame 6', 7', 8', 9' is either covered directly by an outer veneer 2 or, better, a warp-proofing veneer 4 is first placed thereon and such veneer is then covered by the outer veneer 2 in the same manner as described with respect to the veneers 1 and 3. Another aluminum plate 17 is then placed on the outer veneer 2. Unless the assembly of the entire packet as described has been carried out in a veneering press, the packet is now inserted into such a press as shown in Fig. 5. The press has a pair of plates 20 and 21 opposing one another and constructed so that either one or both plates move in a substantially vertical direction toward each other. The plates have a number of passages 22 and 23 extending therethrough for receiving a heating element or a heated substance. In this way, the board can simultaneously be compressed and subjected to heat. The upper surface 14 of the frame 6, 7, 8, 9 and the corresponding lower surface of the frame 6', 7', 8', 9' are also coated with an adhesive either at this stage or, preferably, before each frame is inserted and placed in contact with the filler. If the packet is now compressed by the hot veneering press in a direction transverse or vertical to the veneers, as indicated by the arrows 24 in Fig. 5, the aluminum plate 17 squeezes the filler 5' together, during which time the beveled surfaces 13 of the frames act like an embankment tending to push the main part of the filler toward the middle of the packet, while a smaller part is forced outwardly so as to fill the grooves 15 of both upper and lower frames completely. The grooves 15 are preferably made of a width $b$ so that the filler will be highly compressed particularly adjacent and within the grooves 15 and adhere tightly to the frames. The pressing stroke of the veneering press is completed when the frames 6, 7, 8, 9 and 6', 7', 8', 9' come in contact with each other, and when the filler 5' is compressed to the thickness shown in Figs. 2 and 6. The veneering press is then left in the lower stroke position so as to maintain the pressure upon the plates 17 at a temperature of, for example, 380 to 400° F., which ensures a secure bond of the adhesive with the filler, the frames and the veneers, until the adhesive has set completely. Then, the press is raised permitting the final product of a solid board to be removed therefrom together with the aluminum plates 12 and 17.

The lateral ends of the strips 8, 9, and 8', 9' are preferably designed so as not to fill out the groove portion 15 completely. Thus, the grooves may act as vents to permit the air enclosed in the loose filler to escape therefrom when being compressed. If, however, the strips or sides of the frames are to be mitered together, other suitable vent openings should be provided.

Actual practice has definitely shown that the new method of producing boards or plates for furniture, doors, wall panels, insulating boards, or the like is much cheaper and more easily carried out than similar methods previously known, and that the final product, for example, a door or a table top, complies with the highest requirements which can be made insofar as appearance, heat and sound insulating qualities, and warp-proofness are concerned. When removed from the press, the board may then be further treated like any solid or veneered board, its sides may be planed to fit properly, for example, into a door frame, and its outer surfaces may be stained, varnished, polished, or treated in any other way. If used as a door, the straps of pin or butt hinges may also be molded into one side during the pressing operation, and suitable recesses may be provided for the later insertion of a door lock. If recesses for such hinges or locks are subsequently to be cut into the sides of the door, the frame parts 6, 6' or 7, 7' may at these particular portions be solidified or widened by molding solid blocks of wood into the frame during the pressing process.

The adhesive used for coating the various parts of the board, i. e. for gluing the veneers 1 and 3, and 2 and 4, respectively, together, as well as the outer frames 6 to 9 and 6' to 9' to each other, preferably consists of the same material as used for impregnating the filler 5. Also, it lies within the scope of the invention to assemble the veneers 1 and 3, and 2 and 4, respectively, and the frames 6 to 9 and 6' to 9' thereon, and to glue these parts at least temporarily together so as to facilitate the final assembly of the packet. Also, since the adhesive or binding agent contained in the filler will bond together not only the components thereof but also all those portions which come in contact therewith, i. e. the inner parts of veneers 3 and 4 as well as the beveled surfaces 13 and the walls of the grooves 15, it may in some cases not be necessary to coat the opposite inner surfaces of the veneers 3 and 4 with the adhesive but only the upper and lower surfaces of the frames to secure them to the veneers as well as to each other. Further, suitable means may be provided to insure the proper alignment of the two frames with each other so that when compressed, they will together form a single solid frame with an unbroken outer surface which, to all appearances, consists of a single element.

When subsequently finished along the outer side of the frame, the new product, for whatever purpose it may be used, has the appearance of a high grade piece of solid, veneered, or laminated wood, and completely hides the fact that, internally, it consists of very cheap waste products. Still, as previously pointed out, the qualities of the new product are in every respect superior to those of a board consisting solely of wood.

While the foregoing description sets forth in detail what I regard as the preferred embodiment of my invention, it is to be understood that numerous changes may be made therein without departing from the spirit and scope of the invention as defined in the appended claims.

Having thus described my invention, what I claim as new is:

1. A method of producing boards of pressed composition material comprising the steps of providing a veneer of at least one ply, placing an outer frame having an adhesive coating on its upper and lower sides upon said veneer, placing a filling frame upon said outer frame, loosely filling said filling frame with a filler comprising waste products mixed with an adhesive, slightly compressing said filler in said filling frame, removing said filling frame, placing a second outer frame similar to said first frame and likewise coated with adhesive on its upper and lower surfaces upon the upper surface of said filler, placing a second veneer upon the upper surfaces of said filler and said second outer frame, and subjecting the two outer veneers to heat and a pressure directed vertically to said veneers so as to compress the same until the upper and lower outer frames are in contact with each other, and maintaining such heat and pressure until the adhesive in said filler and on said surfaces has set and the individual elements of said board are securely bonded together.

2. A method of producing boards of pressed composition material comprising the steps of placing a veneer of at least one ply having an adhesive coating on its upper surface upon a flat metallic plate, placing an outer frame having an adhesive coating at least on its upper side upon said veneer, placing a filling frame upon said outer frame, loosely filling said filling frame with a filler comprising waste products mixed with an adhesive, slightly compressing said filler in said filling frame, lifting said filling frame in upward direction from said filler, placing a second outer frame similar to said first frame and likewise coated with adhesive at least on its lower surface upon the upper surface of said filler, placing a second veneer coated with adhesive on its lower surface upon the upper surfaces of said filler and said second outer frame, placing a second flat metallic plate upon said second veneer, heating said metallic plates, and compressing the same until the upper and lower frames are in contact with each other, maintaining such heat and pressure until the adhesive in said filler and on said surfaces has set and the individual elements of said board are securely bonded together, and removing said metallic plates from said veneers.

3. A method of producing boards of pressed composition material comprising the steps of first attaching a pair of outer frames of substantially the same size and shape upon a pair of veneers by means of adhesive, placing one of said veneers with one of said outer frames on its outer surface upon a flat metallic plate, placing a filling frame upon said first outer frame, loosely filling said filling frame substantially to its upper edge with a filler comprising waste products mixed with an adhesive, slightly compressing said filler in said filling frame, lifting said filling frame in upward direction from said filler, coating at least one of the unattached surfaces of said frames with adhesive, placing the second veneer with the second outer frame on the lower surface thereof upon the upper surface of said filler, placing a second flat metallic plate upon said second veneer, heating said metallic plates and compressing the same toward each other in a direction vertically thereto until the upper and lower outer frames are in contact with each other, maintaining such heat and pressure until the adhesive in said filler and on said surfaces has set and the individual elements of said board are securely bonded together, and removing said metallic plates from said veneers.

4. A method of producing boards of pressed composition material comprising the steps of placing a veneer of at least one ply having an adhesive coating on its upper surface upon a flat metallic plate, placing an outer frame having an adhesive coating at least on its upper side upon said veneer, said outer frame having beveled inner edges and a groove in the upper surface and adjacent said beveled edges, placing a filling frame on said outer frame so as to substantially overlie said groove, loosely filling said filling frame substantially to its upper edge with a filler comprising waste products mixed with an adhesive, slightly compressing said filler in said filling frame, lifting said filling frame in upward direction from said filler, placing a second outer frame of a size and shape similar to said first frame and likewise coated with adhesive at least on its lower surface upon the upper surface of said filler and in vertical alignment with said first frame, placing a second veneer of at least one ply and coated with adhesive on its lower surface upon the upper surfaces of said filler and said second outer frame, placing a second flat metallic plate upon said second veneer, heating said metallic plates and compressing them in a direction vertically to said veneers, further compressing said veneers until the opposite flat surfaces of said frames are in contact with each other, maintaining such heat and pressure until the adhesive in said filler and on said surfaces has set and the individual elements of said board are securely bonded together, and removing said metallic plates from said veneers.

5. A method of producing boards of pressed composition material, comprising the steps of attaching a pair of substantially similarly shaped outer frames upon a pair of veneers, respectively; placing one of said veneers together with the outer frame attached thereto upon a supporting surface; placing a filling frame upon said outer frame of said one veneer; loosely filling said filling frame to a predetermined height with a filler mixed with an adhesive; slightly compressing said filler in said filling frame; removing said filling frame from the slightly compressed filler; coating the exposed face of at least one of said outer frames with an adhesive; placing the second veneer together with the outer frame attached thereto upon the upper surface of the slightly compressed filler; and pressing said veneers, together with their respective attached outer frames, toward each other until said outer frames are in face-to-face contact with each other.

6. A method of producing boards of pressed composition material, comprising the steps of attaching a pair of substantially similarly shaped outer frames upon a pair of veneers, respectively; placing one of said veneers together with the outer frame attached thereto upon a supporting surface; placing a filling frame upon said outer frame of said one veneer; loosely filling said filling frame to a predetermined height with a filler mixed with an adhesive; slightly compressing said filler in said filling frame; removing said filling frame from the slightly compressed filler; coating the exposed face of at least one of said outer frames with an adhesive; placing the second veneer together with the outer frame attached thereto upon the upper surface of the slightly compressed filler; and simultaneously heating said veneers and pressing the same, together with their respective attached outer frames, toward each other until said outer frames are in face-to-face contact with each other.

7. A method of producing boards of pressed composition material, comprising the steps of providing a plate; placing an outer frame upon said plate; placing a filling frame upon said outer frame; loosely filling said filling frame with a filler comprising waste products mixed with an adhesive; slightly compressing said filler in said filling frame; removing said filling frame; placing a second outer frame similar to said first outer frame upon the upper surface of said filler, at least one of said outer frames being coated on the surface directed toward the other of said frames with adhesive; placing a second plate upon the upper surface of said filler and said second outer frame;

subjecting the two plates to heat and a pressure directed vertically to said plates so as to press the same towards each other until said upper and lower outer frames are in contact with each other, and maintaining such heat and pressure until the adhesive in said filler and on said surfaces has set and the individual elements of said board are securely bonded together.

8. A method as defined in claim 7, wherein said frames have in the surfaces directed toward each other beveled inner edges and a groove adjacent said beveled edges, and wherein said filling frame is lifted in upward direction from said filler.

References Cited in the file of this patent

UNITED STATES PATENTS

| | | |
|---|---|---|
| 1,911,374 | Loetscher | May 30, 1933 |
| 2,200,650 | Welch | May 14, 1940 |
| 2,354,725 | Weyerhaeuser | Aug. 1, 1944 |
| 2,356,625 | Schumann | Aug. 22, 1944 |
| 2,629,140 | Clements | Feb. 24, 1953 |
| 2,649,135 | Prase | Aug. 18, 1953 |
| 2,661,511 | Weyerhaeuser | Dec. 8, 1953 |
| 2,745,779 | Ritter et al. | May 15, 1956 |